United States Patent [19]

Springer

[11] Patent Number: 4,544,421
[45] Date of Patent: Oct. 1, 1985

[54] MULTI-DIRECTIONAL FIELD ANNEALING OF A THIN-FILM ELECTROMAGNETIC READ/WRITE HEAD

[75] Inventor: Gilbert D. Springer, Sunnyvale, Calif.
[73] Assignee: Ferix Corporation, Fremont, Calif.
[21] Appl. No.: 540,388
[22] Filed: Oct. 11, 1983
[51] Int. Cl.$^4$ ............................................. H01F 41/02
[52] U.S. Cl. ..................................... 148/103; 148/108
[58] Field of Search ............... 148/108, 103; 346/74.5; 29/603

[56] References Cited

U.S. PATENT DOCUMENTS

| | | | |
|---|---|---|---|
| 3,138,494 | 6/1964 | Burket et al. | 148/108 |
| 4,236,230 | 11/1980 | Thompson | 148/108 |
| 4,414,554 | 11/1983 | Springer | 346/74.5 |
| 4,494,125 | 1/1985 | Springer | 346/74.5 |

*Primary Examiner*—Melvyn J. Andrews
*Attorney, Agent, or Firm*—Kolisch, Hartwell, and Dickinson

[57] ABSTRACT

A method of field annealing a thin-film electromagnetic read/write head formed of magnetic-field-responsive material having a known Curie temperature. Such a head also includes an electric coil for operatively exciting the head. The method includes the steps of heating the head to a temperature less than the Curie temperature, and then cooling the head while applying electric current to the coil sufficient to induce magnetic flux in the head. The foregoing steps, properly applied, align the magnetic-field-responsive structure, such as magnetic domains in a soft magnetic material, in the direction of operative flux flow in the head.

4 Claims, 4 Drawing Figures

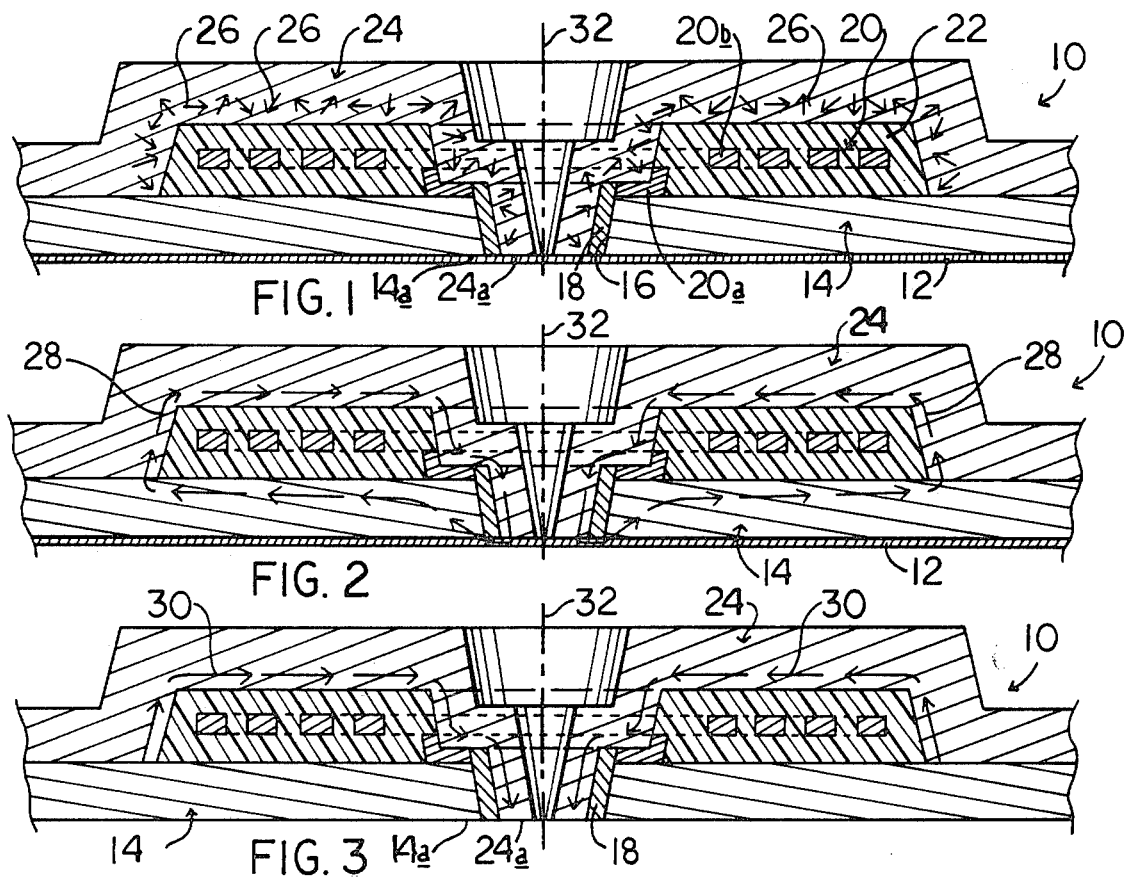
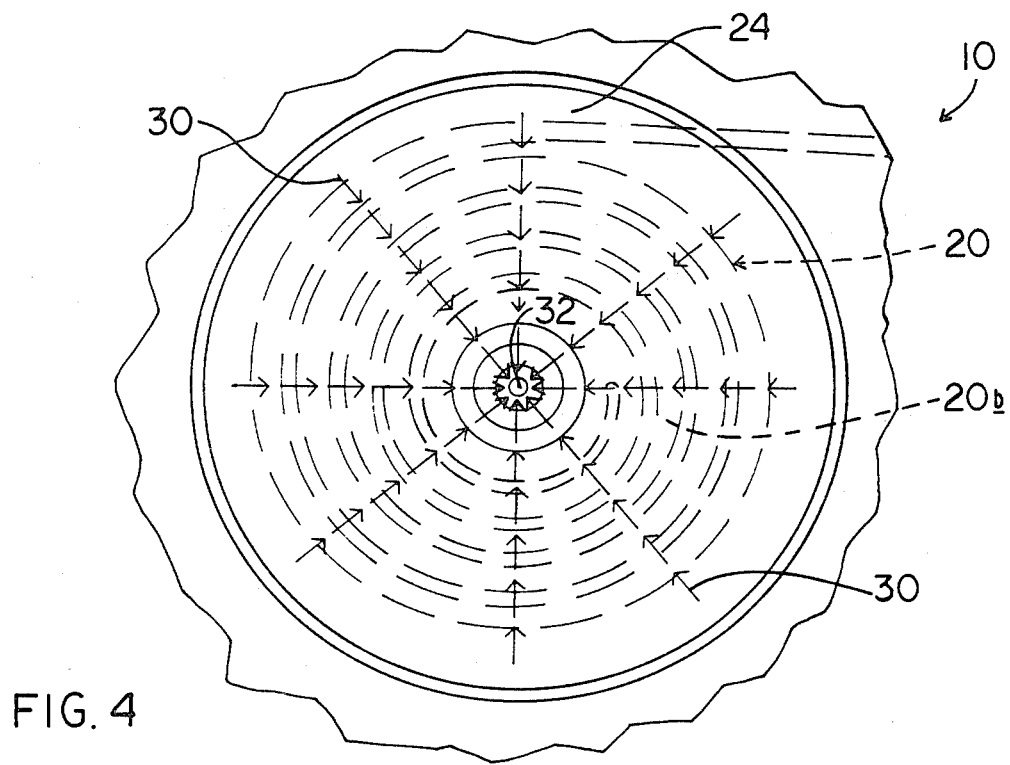

MULTI-DIRECTIONAL FIELD ANNEALING OF A THIN-FILM ELECTROMAGNETIC READ/WRITE HEAD

BACKGROUND AND SUMMARY OF THE INVENTION

This invention pertains to a method of field annealing a thin-film electromagnetic read/write head, and in particular, to such a method producing multi-directional field annealing in such a head.

It is well known that soft magnetic materials contain magnetic-field-responsive structure, such as atomic spins and domains which tend to align with a magnetic field to which they are subjected. When thin-film electromagnetic read/write heads are initially produced, a layer of magnetic material will have, generally speaking, what is known in the trade as an easy access in the plane of the film and a hard axis perpendicular to that plane. However, the particular alignment within the plane on formation of the heads is generally quite random. When such a head is excited to produce flux in the head for reading or writing, this flux field must be strong enough to realign all of the magnetic-field-responsive structure, hereafter simply referred to as domains, with the direction of flux.

Field annealing is a method which has been known for some years. Reference is made in particular to a book entitled *Ferromagnetism*, by Richard M. Bozorth, D. Van Nostrand Company, 1951, pp. 112ff in which the results of experimentation with field annealing hard magnetic materials with an external field are discussed. Typical techniques involve the application of an external field in which an object to be annealed is placed during an annealing process. Thin-film heads however, have magnetic layers which follow the contour of the head and are not disposed within a single plane. The heads contemplated and discussed in the following description relate to magnetic writing heads of the types disclosed in my prior U.S. patent applications, Ser. No. 170,788, entitled "Magnetic Imaging Apparatus" (filed July 21, 1980), and Ser. No. 472,924, entitled "Differential-Permeability Field-Concentrating Magnetic Read/Write Head" (filed Mar. 7, 1983). These applications describe the construction of a head having concentric poles forming an annular read/write gap and flux-inducing electric coils generally concentrically surrounding the poles when viewed perpendicular to the plane of the head. Flux flowing in an operative head of such construction flows radially toward and away from the poles. Additionally, it flows parallel to and at innumerable angles relative to the general plane of the head. Typical external-field annealing techniques, therefore, would produce domain alignment quite inconsistent with the overall flux path of the head.

It is therefore a general object of this invention to provide a method of field annealing a thin-film magnetic head which overcomes the above-noted problem.

More specifically, it is a desired objective to provide such a method in which multi-directional domain alignment is produced.

It is a further objective to provide such a method for providing domain alignment which corresponds with the operative flux path of a head.

These and additional objects and advantages of the present invention will be more clearly understood from a consideration of the drawings and the following detailed description of a preferred embodiment.

DESCRIPTION OF THE DRAWINGS

FIG. 1 is a cross-sectional view of a magnetic read/write head for use in field annealing as contemplated by this invention.

FIG. 2 is a cross-sectional view of the head of FIG. 1 during field annealing.

FIG. 3 is a cross-sectional view of the heads of FIGS. 1, 2 following completion of field annealing.

FIG. 4 is a top fragmentary view at a reduced scale of the head of FIG. 3.

DETAILED DESCRIPTION OF THE INVENTION

Referring initially to FIG. 1, a thin-film electromagnetic read/write head usable in practicing a preferred field annealing method as contemplated by this invention is shown generally at 10. Head 10 is made substantially similar to certain of the heads previously described in my above-identified U.S. patent applications. Each head has what might be thought of as a pancake-sandwich construction, and, when viewed from the point of view of the top side of FIG. 1, i.e., FIG. 4, has a generally circular outline. Forming a temporary base to head 10 is a thin layer of a high permeability but non-electrically conductive magnetic material, which, in the present head, takes the form of a nickel-iron alloy, such as permalloy. Disposed on base 12 is a flexible web 14 formed of a suitable high-permeability magnetic material (which is also electrically conductive), such as 2826 MB Metglas ($Fe_{40} Ni_{38} Mo_4 B_{18}$) and 2605 SE Metglas ($Fe_{81} B_{13.5} Si_{3.5} C_2$), manufactured by Allied Chemical Company.

Provided in web 14 is a tapered annular aperture 16 which opens to both upper and lower faces of the web. Formed within aperture 16, and distributed about the wall therein, is a gold collar 18. Collar 18 also functions as a diamagnetic material as well as an electrical conductor. Web 14 is also electrically conductive for conducting current when the head is energized, as described in my above-noted applications.

A current-carrying electric conductor, shown generally at 20, includes a copper cup 20a which electrically contacts and surrounds the upper end of collar 18. Also included in conductor 20 and formed integrally with cup 20a, is a spiral coil 20b which is disposed substantially symmetrically about aperture 14, as particularly shown in FIG. 4. As can be seen, coil 20b is substantially planar, and lies in a plane spaced somewhat above the top surface of web 14 as shown in FIG. 1. Conductor 20 is also referred to as electric current-carrying means.

Coil 20b is embedded and supported in a layer 22 of a suitable dielectric material, such as Pyralin or Polyimid, as described in my above-referenced prior applications.

Completing a description of head 10, formed over the parts already described is a blanket 24 of a high-permeability but non-electrically conductive magnetic material, such as permalloy. The permalloy used in this preferred embodiment is typically 17 to 20% iron and has a Curie temperature of about 310° C. Blanket 24 extends in a fairly uniform layer, and downwardly with a hollow interior, in the central portion of the head, into cup 20a and into the inside of collar 18. Blanket 24, at the point where it extends to the lower portion of aperture 16, is flush with the lower face or surface of web 14, forming an inner pole 24a. In this embodiment, web 14 and blanket 24 are suitably magnetically connected in the outer regions beyond the periphery of conductor 20.

A second or outer pole face 14a is disposed adjacent collar 18 on the lower face of web 14.

Describing now the preferred method of field annealing a thin-film head, reference is made initially to FIG. 1 which shows a cross section of head 10 subsequent to its manufacture but prior to any field annealing. In this condition, blanket 24, being made of permalloy, has magnetic domains which are represented by (and hereinafter referred to as) small arrows, such as arrows 26. Arrows 26 exist throughout the permalloy, and have a generally random orientation, particularly in the plane of the material, when formed as has been described. Only those domains along the lower margin, as viewed in FIG. 1, have been represented for simplicity of illustration, as will become apparent. In this state, if base 12 were to be lapped off to form an operative read/write head, sufficient magentic force would have to be applied by coil 20b to realign domain arrows 26 during operation. Applicant's invention provides a means for realigning these domains prior to operation to conform to the direction of flux flow existing during operation of the head, which operation then requires a lower magnetic field in order to excite the head sufficiently for operation.

The first step in practicing applicant's invention is to elevate the temperature of head 10, as viewed in FIG. 1, to approximately 240° C. at a rate of 17° C.-per-minute from ambient temperature. Once this temperature is reached, it is maintained preferably for approximately 10 to 12-hours. At the termination of this time period, an electric current is passed through conductor 20 sufficient to apply a magnetic force of 10 to 12-oersteds in the permalloy. In this state, magnetic flux, represented by long arrows 28 in FIG. 2, is caused to flow in the magnetic paths illustrated. The advantage of base 12 is apparent during this stage of the method in that it provides a magnetic short between inner pole face 24a and outer pole face 14a. In normal operation this would be an air gap and would provide substantial reluctance in the magnetic path. Thus, the driving of the head for purposes of field annealing is accomplished with substantially less energy. Additionally, having base 12 shorting the circuit causes the flux to travel through pole faces 14a, 24a very close to collar 18. If base 12 were replaced by air, then the flux would be less dense adjacent the gap due to the substantially lower flux density maintainable in air. This then concentrates the magnetic flux into a more limited region adjacent the gap associated with head 10.

While applying electric current sufficient to induce the magnetic flux just described, head 10 is cooled at 17° C.-per-minute to about 50° C. The current may then be shut off and base 12 lapped from the bottom of head 10 to produce the head shown in FIGS. 3 and 4.

It is particularly important that the magnetic field-annealing field be applied during the cooling phase. It may also be applied during maintenance of the temperature at 240° C., but it has been found that the large majority of realignment occurs during the cooling step.

As a result of this process the short random domain arrows 26 shown in FIG. 1 have been realigned and strengthened by cooperative interaction to form what are shown as arrows 30 in FIGS. 3, 4. Arrows 30 represent the new domain alignment in the operative flux flow path of head 10 within blanket 24. When viewed from the top of FIG. 3, the view of FIG. 4, it can be seen that the new domain alignment is in generally radial directions relative to what may be considered to be the center of head 10. This center, identified by axis 32 shown as a dash-dot line in FIGS. 1-3, shows that, with reference to the plane of FIG. 4, the domains are aligned in essentially every significant direction within head 10.

Similarly, viewing FIG. 3, the domains are aligned in a variety of orientations conforming to the flux-flow path of an operating head. It can therefore be seen that applicant's invention provides a means for conforming domain alignment to a path which is controlled, not by external force fields, but by the internal magnetic field existing during head operation.

If a conventional external field were used to field anneal a head 10, there would be little net operating advantage achieived. Further, an imbalance in flux flow during operation of a head would occur since some resulting domain alignments would counteract the desired flux flow in an operating head. It should further be noted that, ignoring base 12 which is not a part of a completed head, in viewing FIG. 2 it can be seen that the flux during operation travels through web 14 as well as blanket 24. Metglas is characterized as having opposing domain alignment layers in the plane of the Metglas. Some domain re-alignment does occur during the field annealing described previously. A greater effect would be possible if, during the annealing process, the head was raised to a temperature closer to the Curie temperature of Metglas. However this would raise the head temperature to a temperature greater than the Curie temperature of blanket 24, thereby resulting in some permanent magnetization of the blanket. The head would then not be selectively excitable as is normally required.

While a preferred method of practicing the invention has been described herein, it will be understood by those skilled in the art, that various changes may be made therein without departing from the spirit and scope of the invention as defined in the following claims.

It is claimed and desired to secure by Letters Patent:

1. A method of field annealing a thin-film electromagnetic read/write head, having a read/write gap, formed of magnetic material having magnetic-field-responsive structure and a known Curie temperature, and also having electric current-carrying means for inducing magnetic flux in the head flowing in a path through such magnetic material during operation of the head, said method comprising the steps of heating the head to a temperature less than the known Curie temperature, after said heating, cooling the head, during at least said step of cooling, applying electric current to the current-carrying means sufficient to induce magnetic flux in such head, during said step of applying current, magnetically shorting the read/write gap of the head, and by said foregoing steps, aligning magnetic-field-responsive structure in such material with the direction of flux flow in the head.

2. The method of claim 1 which further includes, intermediate the steps of heating and cooling, the step of maintaining the head substantially at the temperature achieved in the heating step for a known period of time.

3. A method of multi-direction field annealing a generally planar, thin-film electromagnetic read/write head having a layer portion formed of magnetic material having magnetic-field-responsive structure and a known Curie temperature, such head being of a type having a pair of complementary concentric poles generally circumferentially symmetrically disposed about an axis substantially normal to the plane of the structure, and an electrical current-carrying spiral winding disposed about such poles energizable to induce magnetic flux to flow generally radially relative to such axis in such material, said method comprising the steps of, heating such a head to a temperature less than the above-mentioned Curie temperature, after said heating, cooling the head, during at least said step of cooling, applying electric current in such winding sufficient to induce magnetic flux in such head, during said step of applying current, magnetically shorting the poles of the head, and by said foregoing steps, aligning magnetic-field-responsive structure in such material with the direction of flux flow in the head.

4. The method of claim 3 which further includes, intermediate after the steps of heating and cooling, the step of maintaining the head substantially at the temperature achieved in the heating step for a known period of time.

* * * * *